(12) United States Patent
Bhakta et al.

(10) Patent No.: US 10,798,350 B2
(45) Date of Patent: Oct. 6, 2020

(54) SPLIT APERTURE PROJECTOR/CAMERA

(71) Applicant: Texas Instruments Incorporated, Dallas, TX (US)

(72) Inventors: Vikrant R. Bhakta, Sunnyvale, CA (US); Jeffrey Matthew Kempf, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 71 days.

(21) Appl. No.: 16/050,697

(22) Filed: Jul. 31, 2018

(65) Prior Publication Data
US 2020/0045274 A1 Feb. 6, 2020

(51) Int. Cl.
*H04N 9/31* (2006.01)
*H04N 5/74* (2006.01)
*H04N 5/225* (2006.01)

(52) U.S. Cl.
CPC ......... *H04N 9/3176* (2013.01); *H04N 5/2251* (2013.01); *H04N 5/7458* (2013.01); *H04N 9/3108* (2013.01)

(58) Field of Classification Search
CPC .. H04N 9/3176; H04N 5/2251; H04N 5/7458; H04N 9/3108
See application file for complete search history.

(56) References Cited

U.S. PATENT DOCUMENTS

| 7,952,817 | B2 | 5/2011 | Kang et al. | |
|---|---|---|---|---|
| 8,125,558 | B2 | 2/2012 | Davis | |
| 8,876,297 | B2* | 11/2014 | Fujinawa | G03B 21/16 353/52 |
| 9,918,056 | B2* | 3/2018 | Nozaki | H04N 9/3176 |
| 2007/0040921 | A1 | 2/2007 | Davis et al. | |
| 2009/0016710 | A1* | 1/2009 | Nozaki | G03B 17/18 396/159 |
| 2009/0153712 | A1* | 6/2009 | Davis | H04N 5/225 348/305 |
| 2011/0176797 | A1 | 7/2011 | Lu | |
| 2011/0234859 | A1 | 9/2011 | Pao | |

OTHER PUBLICATIONS

Rangarajan, "Perspective Imaging under Structured Light", Proceedings of the European Conference on Computer Vision (ECCV'10), Sep. 2010, Greece. Springer International Publishing AG, Gewerbestrasse 11, 6330 Cham, Switzerland DOI: 10.1007/978-3-642-15567-3_30 • Source: DBLP.

* cited by examiner

*Primary Examiner* — Twyler L Haskins
*Assistant Examiner* — Angel L Garces-Rivera
(74) *Attorney, Agent, or Firm* — Michelle F. Murray; Charles A. Brill; Frank D. Cimino

(57) ABSTRACT

Described examples include an optical apparatus having a first lens, a first optical element having a first aperture, a second lens, and a second optical element having a second aperture. The optical apparatus includes a third lens having a first portion to receive projected light from the first lens through the first aperture and to project the projected light onto a target. Also, the third lens has a second portion to receive reflected light reflected from the target and to provide the reflected light to the second lens through the second aperture.

17 Claims, 9 Drawing Sheets

SPLIT APERTURE PROJECTOR/CAMERA

TECHNICAL FIELD

This relates generally to optical projectors, and more particularly to a projector/camera combination.

BACKGROUND

Projectors may project a large image for various applications, such as entertainment and meeting presentations. An enhanced level of functionality may be achieved by allowing a human user to interact with the projected image. For example, a projector connected to a computer may project an interactive display, which allows the user to touch specific locations on the projected image, so the computer will alter the projected image in accordance with that touched location. One way of achieving this functionality is with a laser curtain on the display screen. A laser curtain is a series of invisible laser beams on two perpendicular edges of the display screen, with receptors on the opposing edges of the display screen. When the user touches the screen, the user's finger interrupts two of the laser beams, which the receptors sense. This indicates where the user is touching, so the connected computer will (in response such touching) alter the projected image accordingly. However, if the laser curtain is mounted to the display screen (onto which the projector projects), then moving this type of system is difficult. Also, calibration between the projector and the laser curtain involves complex algorithms.

To determine activity on a projected image, another method points an electronic camera at the screen, such as in U.S. Pat. No. 8,125,558. However, calibration of the camera with the projector is even more complex. Some systems try to integrate a camera function with the projection function, such as in U.S. Patent Application Publication No. 2011/0176797, U.S. Patent Application Publication No. 2007/0040921 and U.S. Patent Application Publication No. 2011/0234859. However, those systems have functional limitations that limit their usefulness. For example, if the system uses a separate camera, then it requires a difficult calibration with the projector. Or, if the system concentrically integrates the camera into the projector, then it limits information that can be determined using that camera, and a mechanism to swap between the projector and the camera functions will add complexity and a possibility of image degradation.

SUMMARY

In an example, an optical apparatus includes a first lens, a first optical element having a first aperture, a second lens, and second optical element having a second aperture. The optical apparatus includes a third lens having a first portion to receive projected light from the first lens through the first aperture and to project the projected light onto a target. Also, the third lens has a second portion to receive reflected light reflected from the target and to provide the reflected light to the second lens through the second aperture.

DETAILED DESCRIPTION

Figure 1:
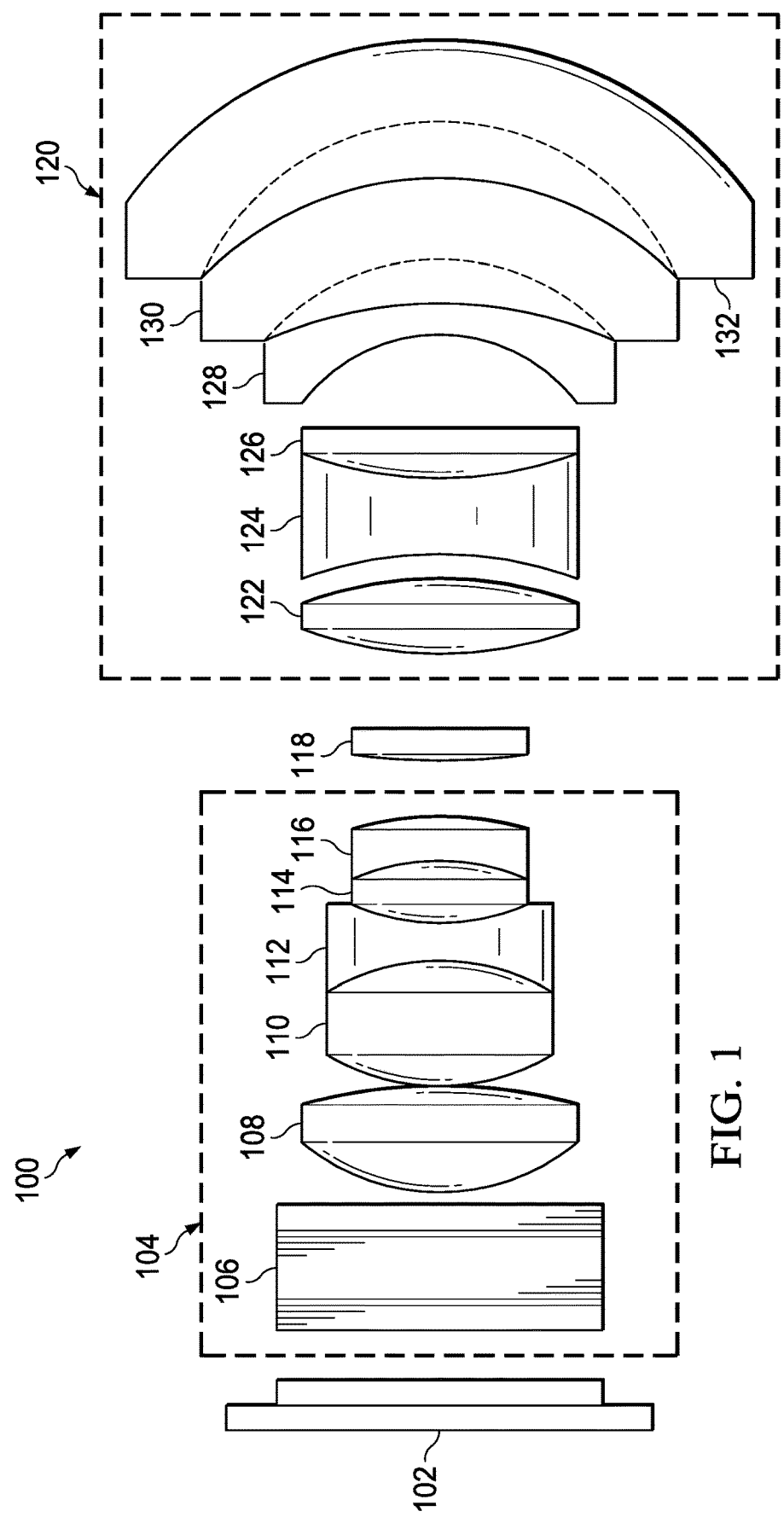
FIG. 1 is a diagram of example projection optics.

In the drawings, corresponding numerals and symbols generally refer to corresponding parts unless otherwise indicated. The drawings are not necessarily drawn to scale.

In this description, the term "coupled" may include connections made with intervening elements, and additional elements and various connections may exist between any elements that are "coupled."

FIG. 1 is a diagram of example projection optics 100. Spatial light modulator 102 is a digital micromirror device in this example. Spatial light modulator 102 provides reflected modulated light from a light source (not shown). The modulated light first passes to lens group 104. Lens group 104 includes protective plate 106, lens 108, lens 110, lens 112, lens 114 and lens 116. An optical element including aperture 118 follows lens group 104 and, in some examples, is part of lens group 104. Protective plate 106 provides an optical pathway from spatial light modulator 102 while protecting the delicate circuits and mechanisms (such as micromirrors) of spatial light modulator 102. Lenses 108, 110, 112, 114 and 116 correct for errors, such as field curvature, astigmatism, spherical aberration, chromatic aberration and other errors. U.S. Pat. No. 7,952,817, which is incorporated herein by reference in its entirety, shows an example lens system that corrects such factors.

After passing through lens 116, the modulated light passes through aperture 118, which limits the light to light that is more collimated to provide a greater depth of focus. In some cases, the aperture can be varied to limit the light to provide better black level performance. The modulated light passes through aperture 118 to lens group 120.

Lens group 120 provides the wide field necessary to project the image onto the target (not shown). Lenses 122, 124 and 126 prepare the modulated light from aperture 118 for projection by lenses 128, 130 and 132. Lenses 128, 130 and 132 are large high-quality lenses that, in some examples, are movable relative to each other. The relative movement allows for functions such as zooming and focusing. The movability and large size of the lenses of group 120 makes these lenses and the systems that accompany them expensive to manufacture. Lenses 128, 130 and 132 also may be aspherical lenses, which increases the cost of manufacture.

Figure 2:
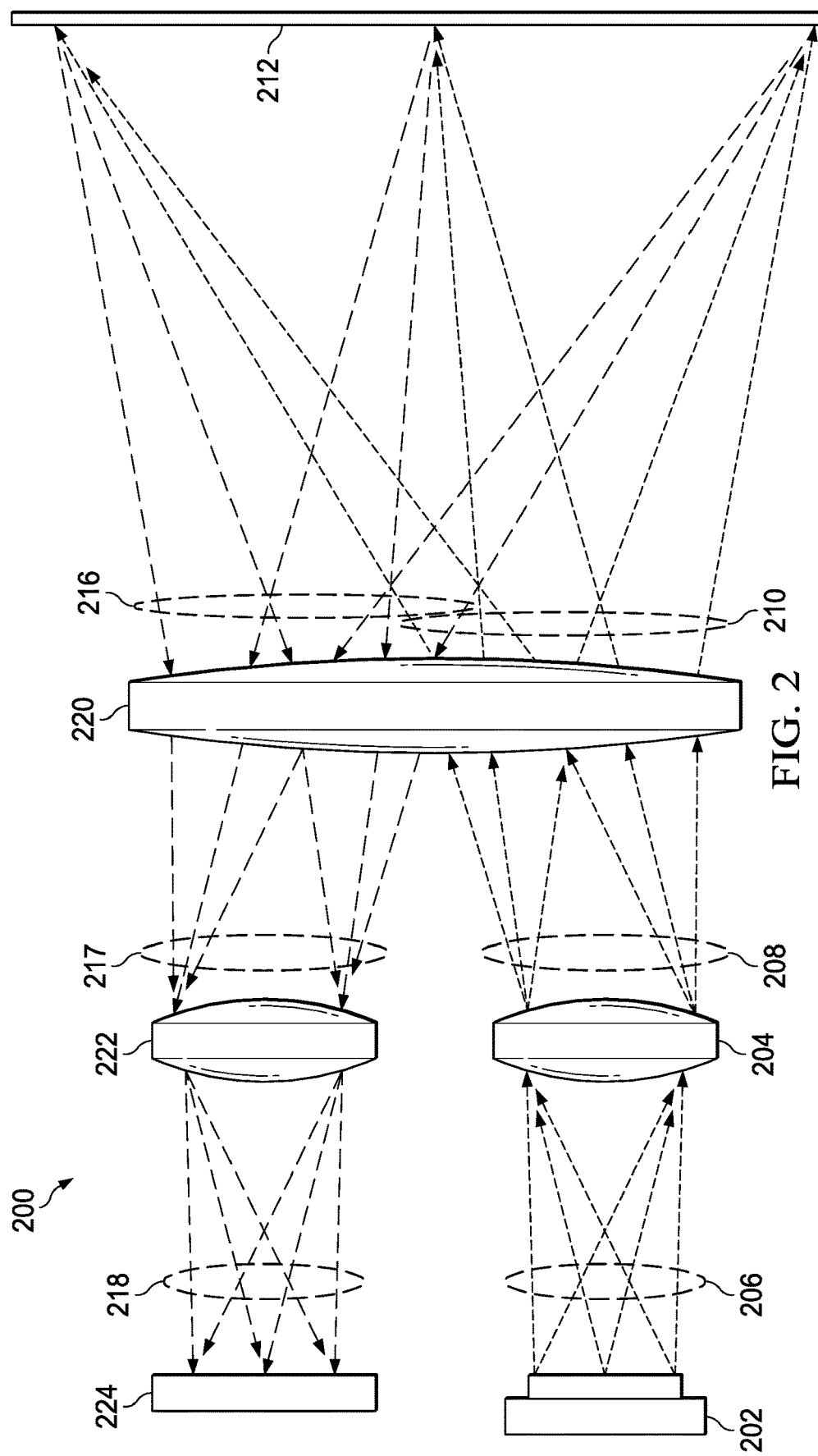
FIG. 2 is a diagram of an example projector/camera.

FIG. 2 is a diagram of an example projector/camera 200. Spatial light modulator 202 provides modulated light to lens group 204. Lens group 204 may be similar to lens group 104 along with the optical element including aperture 118 (FIG. 1). Light rays 206 converge at lens group 204 to indicate passage through the aperture of an optical element within lens group 204. It is not physically accurate that the rays extend across all of lens group 204. However, the representation of light rays 206 in FIG. 2 is easier to follow than a representation where all light rays pass through the aperture. Light rays 206 pass through lens group 204 and emerge as light rays 208. Light rays 208 do not extend across the full width of lens group 220, but instead extend across a first portion of lens group 220. Lens group 220 is similar to lens group 120 (FIG. 1). Light rays 208 pass through lens group 220 as light rays 210, which cover the full extent of target 212. In this example, target 212 is a projection screen.

A portion of the light from light rays 210 reflects off target 212 as reflected light rays 216. Light rays 216 extend across a second portion of lens group 220. In this example, the first portion of lens group 220 and the second portion of lens group 220 are equidistant from and on opposite sides of a central axis of lens group 220. However, the positioning of the first and second portions is not limited to any configuration. The light reflected from target 212 includes more light than light rays 216. Light rays 216 represent the portion of the reflected light as limited by the aperture of an optical element within lens group 222, which is structurally similar to lens group 204. Accordingly, lens group 222 may have the same configuration as lens group 204. However, differences in size and positioning of sensor 224 and spatial light modulator 202 may cause changes in the configuration of lens groups 204 and 222 to accommodate those differences in size and position. Also, functional differences may cause changes to the configuration of lens groups 204 and 222. For example, sensor 224 may receive one band of light, such as near-infrared. In this case, correction for chromatic aberration by lens group 222 would be unnecessary.

Light rays 216 pass through the second portion of lens group 220 as light rays 217. Light rays 217 pass through lens group 222 as light rays 218 to sensor 224. Sensor 224 is a light sensing device, such as an array of photodiodes or a charge-coupled device. The function of sensor 224 is to capture the light as projected onto target 212. Therefore, sensor 224 functions as the sensor of a camera to capture the scene projected onto target 212 and allows for functionality, such as autofocus and touch sensing, as further described hereinbelow. Lens group 220 performs functions, such as zoom and focus. Because both the projector and camera use lens group 220, these functions automatically apply to the optical paths of both the camera and the projector.

As shown in FIG. 2, lens group 220 does not function exactly like lens group 120 (FIG. 1), because light passing through only a portion of lens group 220 extends to the full range of the target 212. In lens group 120, light passing through the full extent of lens group 120 extends to the full range of the target. Therefore, the profiles of the lenses within lens group 220 are modified accordingly.

Figure 3:
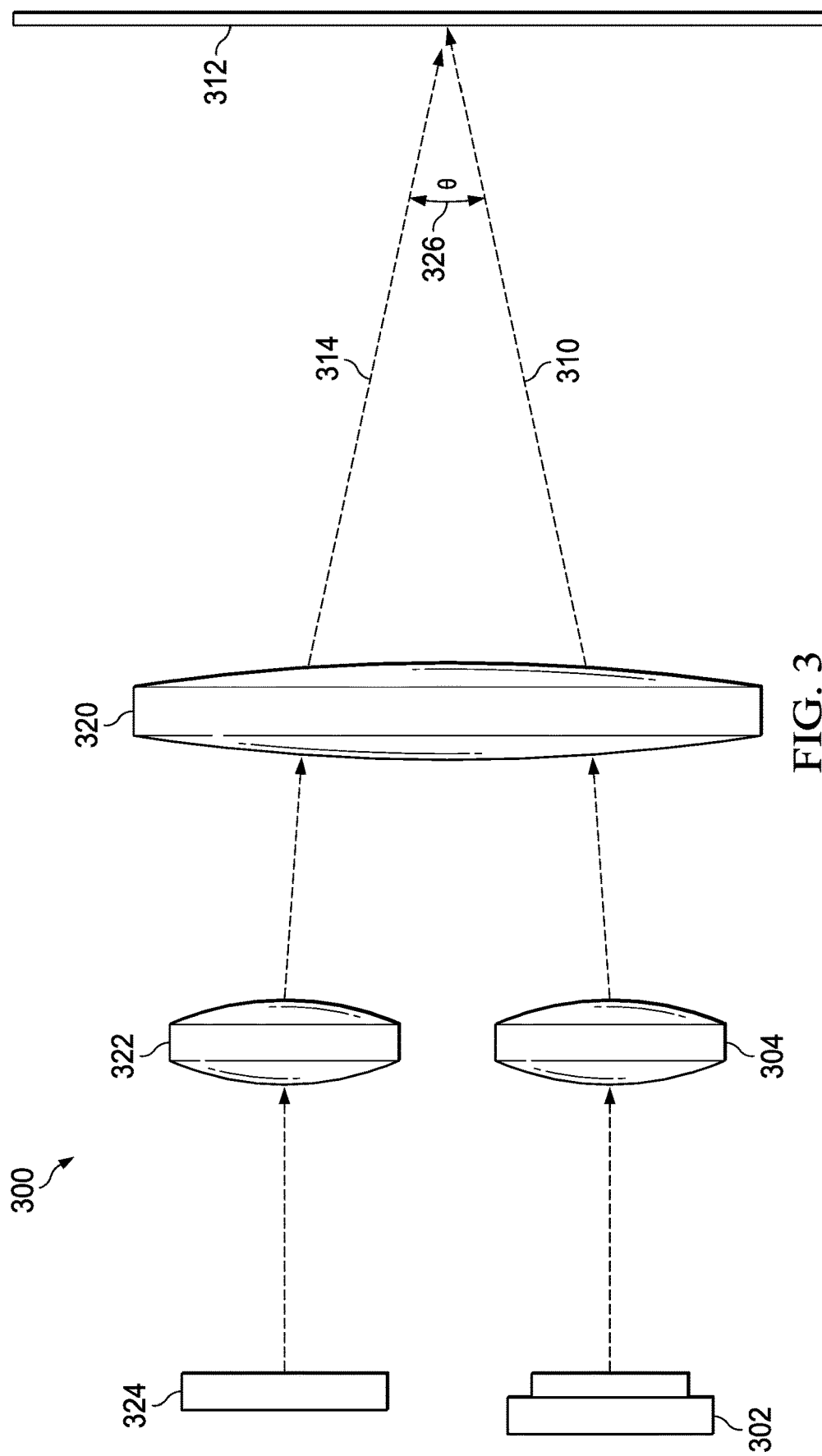
FIG. 3 is a diagram of the example projector/camera of FIG. 2, showing only central rays.

FIG. 3 is a diagram of projector/camera 200 (FIG. 2), showing only central rays. In projector/camera 300, the projected rays 310 project from spatial light modulator 302 through first lens group 304, and through a first portion of lens group 320 to target 312. Reflected rays 314 reflect from target 312, through the second portion of lens group 320, and through lens group 322 to sensor 324. FIG. 3 illustrates the angle difference (θ) 326 between the direction of projected rays 310 and reflected rays 314. This difference in angle allows for the use of parallax to determine the distance of the target, as further described hereinbelow.

Figure 4:
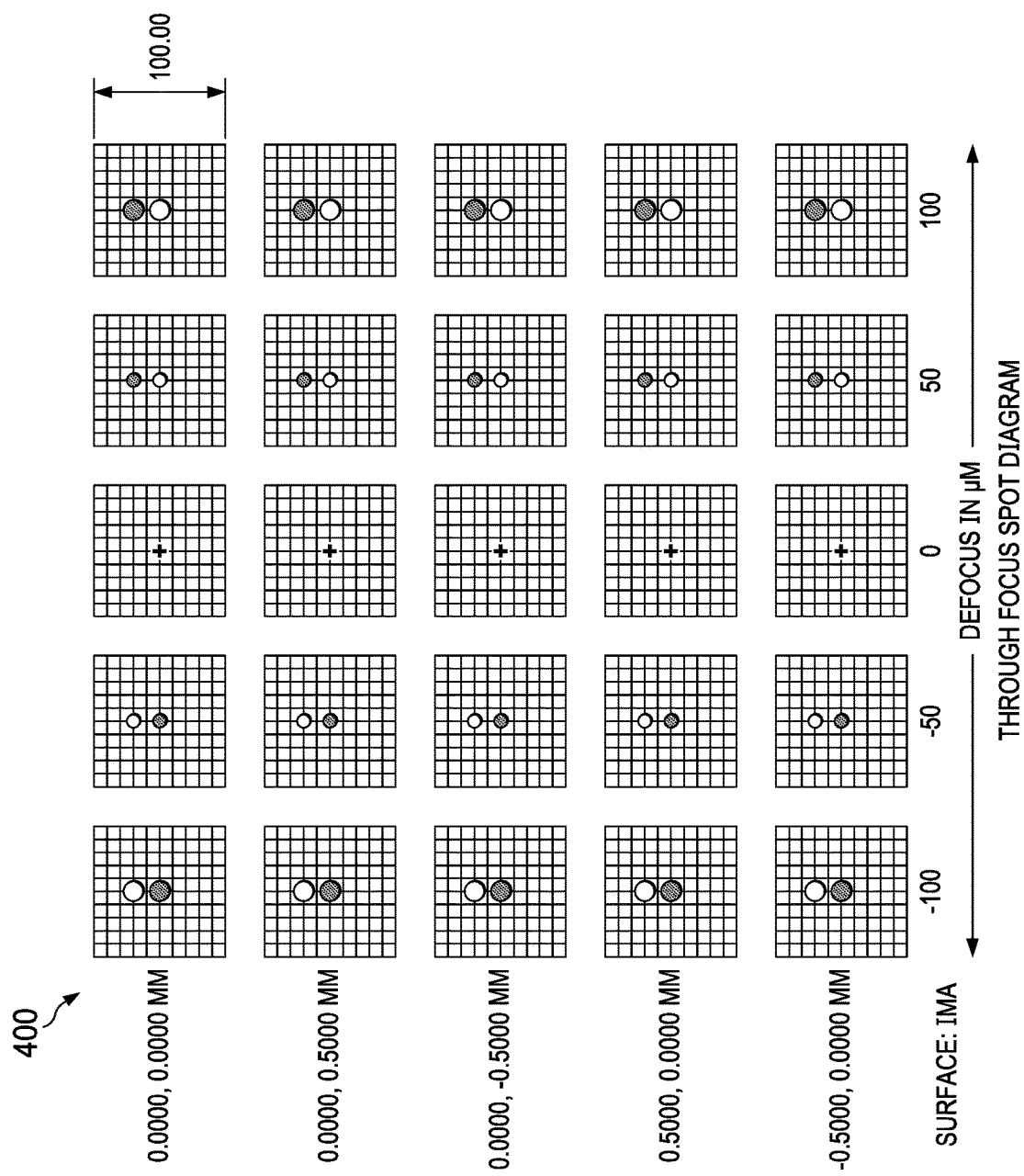
FIG. 4 is a chart showing the result of various states of focus using the example projector/camera of FIG. 2.
Figure 5:
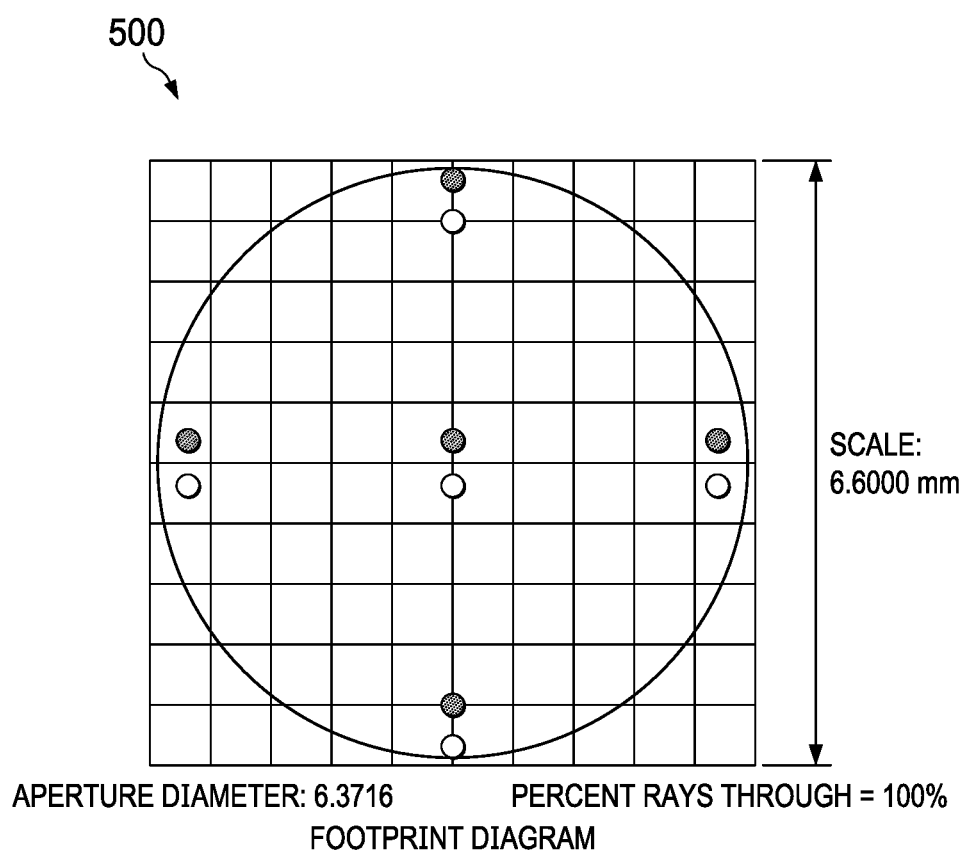
FIG. 5 is a diagram of a simulation of the example projector/camera of FIG. 2 that is 100 μm out-of-focus.

FIG. 4 is a chart showing the result of various states of focus using projector/camera 200 (FIG. 2). The first column of chart 400 shows the position of projected spots, where 0.0000, 0.0000 is the center of the projected image. The next five columns are levels of defocus as labeled at the bottom of the column. In the first column showing −100 μm out-of-focus, the upper dot is the dot received by sensor 224, and the lower dot is the dot projected from spatial light modulator 202. The size of the dot indicates a fuzziness of the projected and received images at the screen. In the column labeled −50 μm out-of-focus, the spots are smaller and closer together. In the column labeled 0 μm out-of-focus, the dots are so small as to be barely visible, and they directly coincide. In columns 50 and 100 μm out-of-focus, the dots are identical to −50 and −100 μm out-of-focus, respectively, except that the projected dot is on top. FIG. 5 is a diagram 500 of a simulation showing the dots from the 100 μm out-of-focus, as they would appear on the target. The distance between dots is a function of the parallax between the projector and camera paths. The geometry of parallax and the known distance between the projection and camera paths provides very precise information for autofocus for the projector. For example, on startup, the projector projects a test pattern. By determining the shift in the received image, the projector/camera can determine the precise level of optical parameters (such as focus, depth of focus (DOF) and/or aperture setting) from the parallax shift and adjust optical settings accordingly. Parallax calculations can also measure the distance of an object from the projector/camera.

Figure 6:
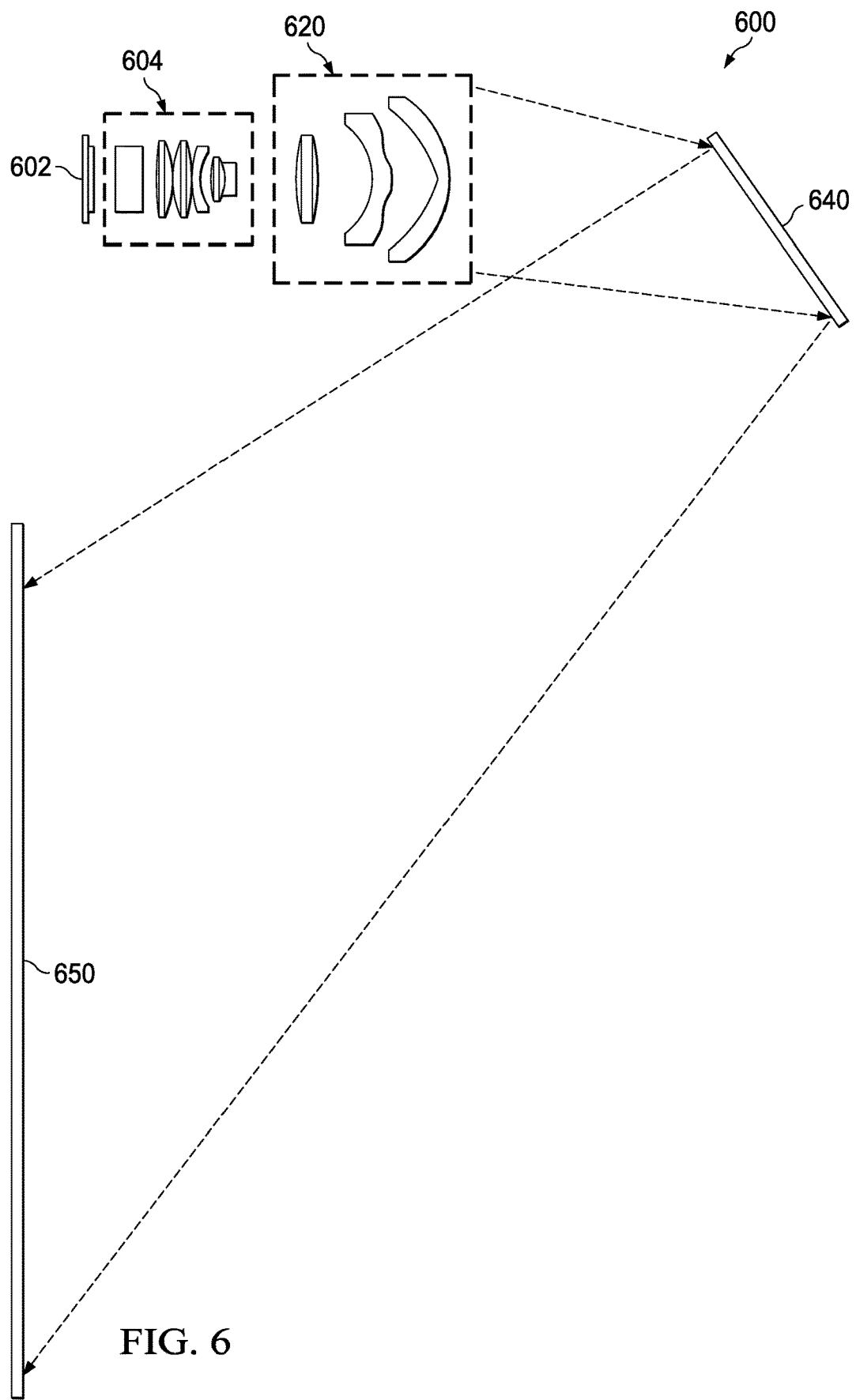
FIG. 6 is a diagram of an example ultra-short throw (UST) projector.

FIG. 6 is a diagram of an example ultra-short throw (UST) projector 600. UST projectors can be placed very close to the target projection screen, such as above the screen. This type of projector is particularly useful in a conference room environment. Instead of placing a projector at the back of a table and potentially blinding some people sitting at the table, a UST projector may be placed at the end of the table nearest the screen or on a console table under the screen. Projector 600 includes spatial light modulator 602 that projects light through lens group 604, through lens group 620 to mirror 640. The image reflects from mirror 640 onto the target 650.

Figure 7:
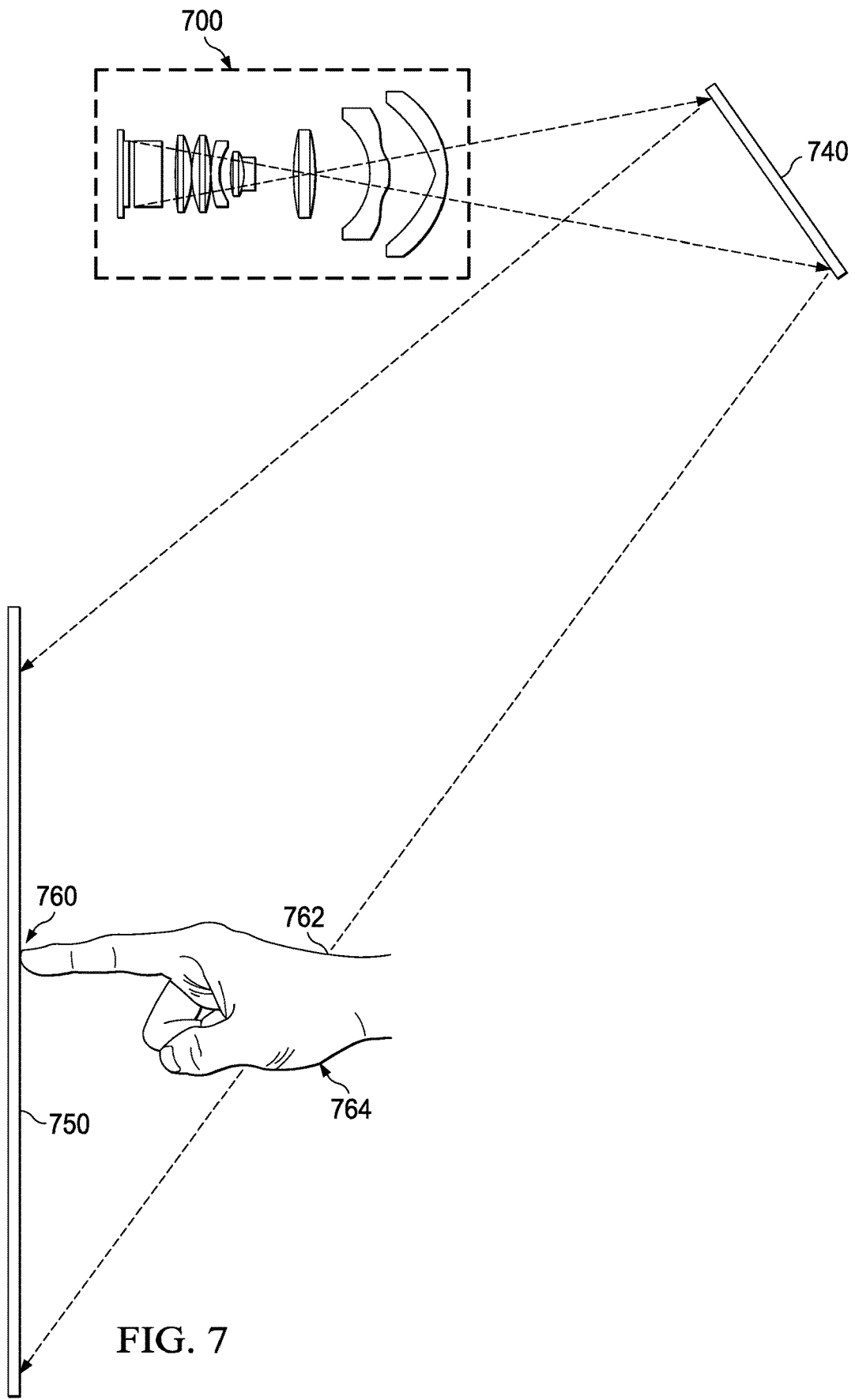
FIG. 7 is a diagram of the example projector of FIG. 6, illustrating geometry of using an active screen concept with a UST projector.

FIG. 7 is a diagram of projector 600 (FIG. 6), illustrating the geometry of using an active screen concept with UST projectors. Projector 700 projects onto screen 750 via mirror 740. A touch 760 by a human hand 764 to the screen 750 is a touch to an active component in the projected image. A separate camera (not shown) or a camera concentric with projector 700 detects the touch to the screen 750. At the screen 750, the image is perfectly focused. At this point, the camera can accurately indicate the position of the touch. However, because of the steep angle of projection, the projected image also reflects from the person's hand 764 at other points, such as point 762. This point is from a portion of the image much lower than the intended portion. Because of this, the camera, especially a concentric camera, may not be able to detect the correct position of the touch.

Figure 8:
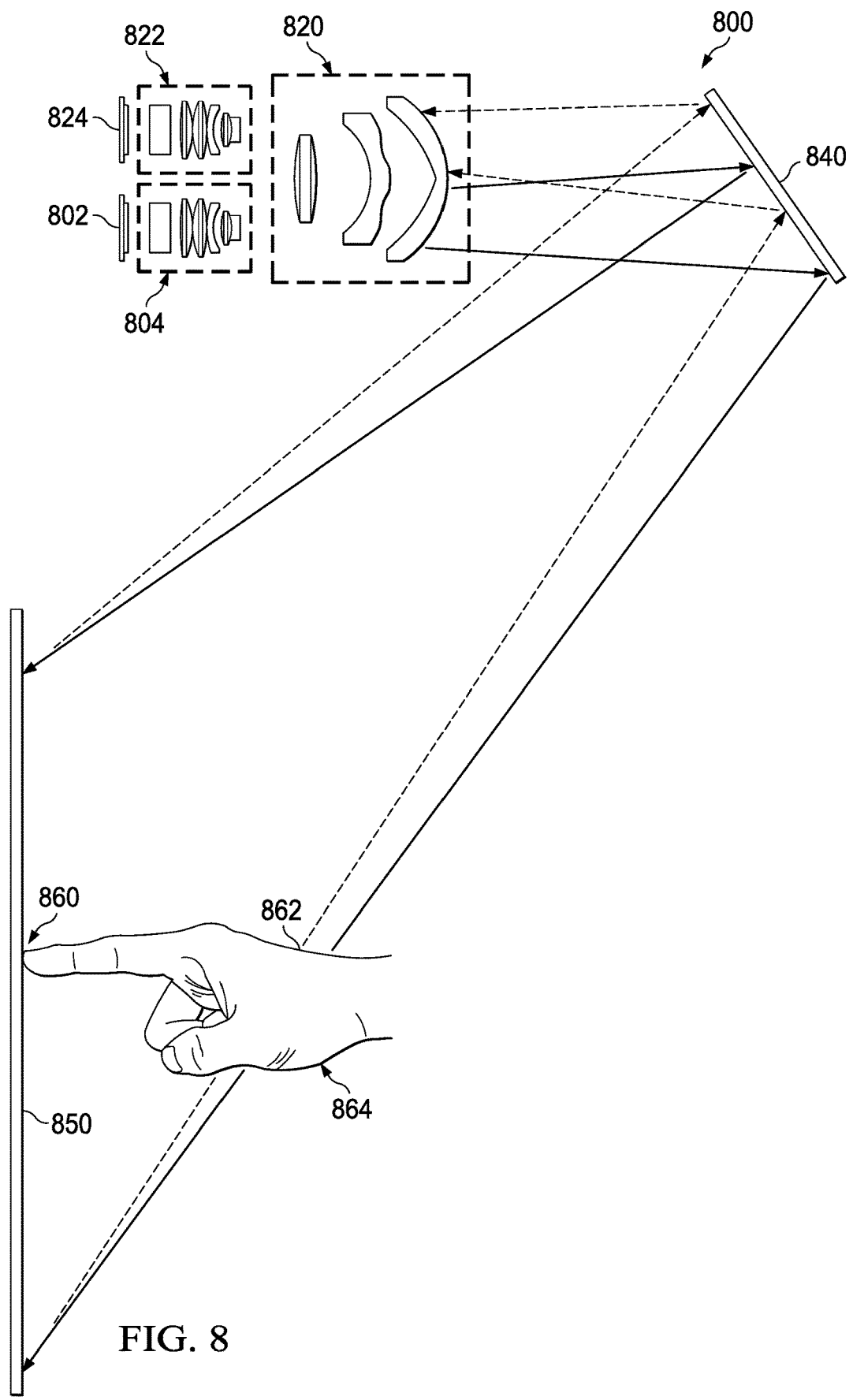
FIG. 8 is a diagram of another example projector/camera.

FIG. 8 is a diagram of another example projector/camera 800. Projector/camera 800 includes spatial light modulator 802, lens group 804, lens group 820, sensor 824, lens group 822 and mirror 840. Projector/camera 800 is like projector/camera 200, except that lens group 820 has a configuration for a UST system. Thus, a dual aperture system with a projector and a camera (such as projector/camera 200) easily incorporates into a UST system. Like lens group 220, lens group 820 is modified, so that projection rays from lens group 804 project onto the whole projection screen 850, even though the rays from lens group 804 direct to a portion of lens group 820. Similarly, lens group 820 is modified, so that rays from the full extent of the projection screen pass through a portion of lens group 820 and through lens group 822 to sensor 824. Although spatial light modulator 802 and sensor 824 are arranged vertically relative to the page of FIG. 8, spatial light modulator 802 and sensor 824 may be in any relative arrangement. For example, spatial light modulator 802 and sensor 824 may be arranged horizontally, so that one or the other of them is closer to the viewer of the page. Using the parallax function available with this example, computing resources (not shown) connected to sensor 824 may determine that point 862 (and every other reflection from hand 864 other than point 860) is not at the point of focus. Therefore, projector/camera 800 can quickly determine the precise location that the user intends to touch.

Figure 9:
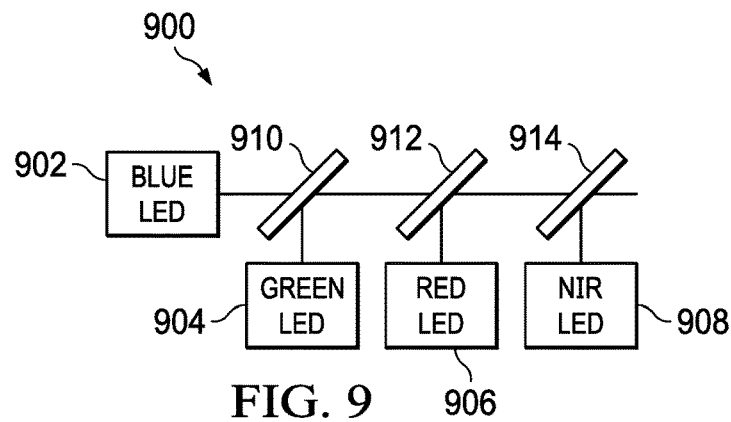
FIG. 9 is a diagram of a light source system.

FIG. 9 is a diagram of a light source system 900. Light source system 900 includes a blue modulated light source 902, a green modulated light source 904, a red modulated light source 906 and a near-infrared modulated light source 908. In this example, laser diodes are the source of light in each of these modulated light sources. For example, light source system 900 may be the input projection light source in projector/camera 200, as a substitute for spatial light modulator 202 (FIG. 2). In light source system 900, blue modulated light from blue modulated light source 902 combines with green modulated light from green modulated light source 904 by dichroic mirror 910. Dichroic mirror 910 is a short wave pass mirror with a filter point to pass blue light but reflect green light. Therefore, the output from dichroic mirror 910 is a combination of the blue and green modulated light. Similarly, dichroic mirror 912 is a short wave pass mirror with a filter to pass green and blue light but reflect red light. Finally, dichroic mirror 914 passes visible light (red-green-blue) but reflects near-infrared light. Therefore, the output of light source system 900 is a combination of blue modulated light source 902, green modulated light source 904, red modulated light source 906 and near-infrared modulated light source 908.

The use of near-infrared light is useful in a system like projector/camera 200 (FIG. 2). For example, sensor 224 (FIG. 2) may be a near-infrared sensor. In this case, near-infrared modulated light source 908 may provide structured light that is invisible to the viewer. Structured light is a known pattern of light that, using mathematical techniques, allows for very precise determination of the scene. One useful light structure is a striped structure. As shown in FIG. 4, with projector/camera 200, the projected and received light may not be perfectly coincident vertically, but will always be coincident horizontally. Therefore, projecting a light structure with vertical strips allows for precise detection using structured light, even though parallax displacement may exist vertically. This allows for very precise detection of the scene, even to the sub-pixel level using a technique called optical super resolution (OSR) (see Rangarajan et al., "Perspective Imaging under Structured Light," Proceedings of the European Conference on Computer Vision (ECCV '10), Part VI, LNCS 6316, pp. 405-419, September 2010 ("Rangarajan"), which is hereby incorporated herein by reference in its entirety). Briefly, in OSR, the structured light has a frequency of the stripes across the scene. Computing resources (not shown) analyze the reflection of the structured light to determine the position and size of objects in the scene by mathematically decomposing the frequency of the image received. Repeating this analysis several times for structured light, with repeated shifts of less than a full "wavelength" (such as by ¼ of the width of a stripe pair), allows for resolution of objects on a subpixel level (see Rangarajan for details of this calculation). Thus, the structure of projector/camera 200 allows for both parallax distance detection and OSR. The use of structured light and/or OSR is not limited to near-infrared light.

The example of FIG. 2 is also useful in applications that do not involve a projection screen. For example, the example of FIG. 2 is useful in wide field-of-view (WFOV) applications. One such application is automobile headlights using spatial light modulation. Instead of illuminating an entire scene, modulated headlights can direct light specifically on a pixel by pixel basis. Using the example of FIG. 2, structured light (such as near-infrared light) can be used to determine the position and speed of objects in a wide field-of-view. Also, parallax distance detection can rapidly determine distance, and thus speed, of objects. Using this information, the controller of a spatial light modulator in the headlight directs the light to the object in a non-blinding manner. For example, if the sensor detects another car, then the spatial light modulator can direct light to the lower portion of that car. In this manner, the high-intensity headlight function (commonly called "brights"), where conventional headlights illuminate the entire scene with maximum intensity light, is not necessary because this system will automatically illuminate distant objects in a non-blinding manner.

Another useful application of the example of FIG. 2 is eye safety with laser-based projection. Solid state illumination (SSI) projectors used laser diodes as the light source. These lasers can damage the eye. Using parallax object detection, the example of FIG. 2 can quickly determine whether someone has intruded the field of projection. The modulation of the projected light then quickly alters to stop projection onto the intrusion, thereby quickly removing the laser light that may be projecting into the intruder's eyes to avoid injuring the intruder.

Figure 10:
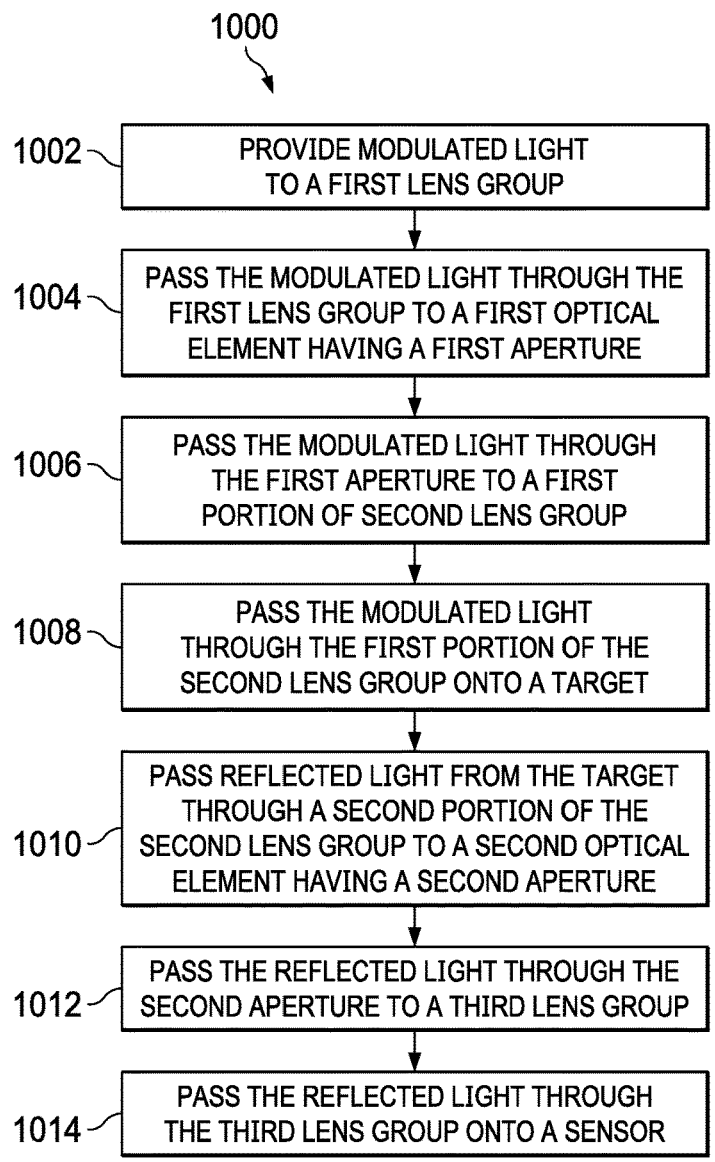
FIG. 10 is a flow diagram of an example process.

FIG. 10 is a flow diagram of an example process 1000. Step 1002 provides modulated light to a first lens group. At step 1004. the modulated light passes through the first lens group to a first optical element including a first aperture. At step 1006. the modulated light passes through the first aperture to a first portion of the second lens group. At step 1008. the modulated light passes through the first portion of the second lens group onto a target. At step 1010. light reflected from the target through a second portion of the second lens group passes to a second optical element having a second aperture. At step 1012. the reflected light passes through the second aperture to a third lens group. At step 1014. the reflected light passes through the third lens group onto a sensor.

Modifications are possible in the described examples, and other examples are possible, within the scope of the claims.

What is claimed is:

1. An optical apparatus comprising:
a first lens;
a first optical element having a first aperture;
a second lens;
a second optical element having a second aperture; and
a third lens having first and second portions equidistant from and on opposite sides of a central axis of the third lens, the first portion configured to receive projected light from the first lens through the first aperture and to project the projected light onto a target, and the second portion configured to receive reflected light reflected from the target and to provide the reflected light to the second lens through the second aperture.

2. The optical apparatus of claim 1 wherein the projected light is provided to the first lens from a spatial light modulator.

3. The optical apparatus of claim 1 wherein the reflected light is provided from the second lens to a sensor.

4. The optical apparatus of claim 1 wherein the target is a projection screen.

5. The optical apparatus of claim 1 wherein the first lens is a lens group.

6. The optical apparatus of claim 1 wherein the second lens is a lens group.

7. The optical apparatus of claim 1 wherein the third lens is a lens group.

8. An optical apparatus comprising:
a first lens;
a first optical element having a first aperture;
a second lens having a same configuration as the first lens;
a second optical element having a second aperture; and
a third lens having first and second portions, the first portion configured to receive projected light from the first lens through the first aperture and to project the projected light onto a target, and the second portion configured to receive reflected light reflected from the target and to provide the reflected light to the second lens through the second aperture.

9. An optical apparatus comprising:
a first lens group;
a first optical element having a first aperture;
a second lens group having a same configuration as the first lens group;
a second optical element having a second aperture; and
a third lens group having: a first portion configured to receive projected light from the first lens group through the first aperture and to project the projected light onto a target; and a second portion configured to receive reflected light reflected from the target and to provide the reflected light to the second lens group through the second aperture, the reflected light being provided from the second lens group to a sensor.

10. The optical apparatus of claim 9 wherein the projected light is provided to the first lens group from a spatial light modulator.

11. The optical apparatus of claim 9 wherein the target is a projection screen.

12. An optical apparatus comprising:
a first lens group;
a first optical element having a first aperture;
a second lens group;
a second optical element having a second aperture; and
a third lens group having first and second portions equidistant from and on opposite sides of a central axis of the third lens, the first portion configured to receive projected light from the first lens group through the first aperture and to project the projected light onto a target, and the second portion configured to receive reflected light reflected from the target and to provide the reflected light to the second lens group through the second aperture, the reflected light being provided from the second lens group to a sensor.

13. An optical apparatus comprising:
a first lens group;
a first optical element having a first aperture;
a second lens group;
a second optical element having a second aperture; and
a third lens group having: a first portion configured to receive projected light from the first lens group through the first aperture and to project the projected light onto a target; and a second portion configured to receive reflected light reflected from the target and to provide the reflected light to the second lens group through the second aperture, the reflected light being provided from the second lens group to a sensor;
the projected light including near-infrared light.

14. An optical apparatus comprising:
a first lens group;
a first optical element having a first aperture;
a second lens group;
a second optical element having a second aperture; and
a third lens group providing ultra-short throw (UST) projection and having: a first portion configured to receive projected light from the first lens group through the first aperture and to project the projected light onto a target; and a second portion configured to receive reflected light reflected from the target and to provide the reflected light to the second lens group through the second aperture, the reflected light being provided from the second lens group to a sensor.

15. A method comprising:
providing modulated light to a first lens group;
passing the modulated light through the first lens group to a first optical element having a first aperture;
passing the modulated light through the first aperture to a first portion of a second lens group having a same configuration as the first lens group;
passing the modulated light through the first portion of the second lens group onto a target;
passing reflected light from the target through a second portion of the second lens group to a second optical element having a second aperture;
passing the reflected light through the second aperture to a third lens group; and
passing the reflected light through the third lens group to a sensor.

16. The method of claim 15 wherein the target is a screen.

17. A method comprising:
providing modulated light to a first lens group;
passing the modulated light through the first lens group to a first optical element having a first aperture;
passing the modulated light through the first aperture to a first portion of a second lens group;
passing the modulated light through the first portion of the second lens group onto a target;
passing reflected light from the target through a second portion of the second lens group to a second optical element having a second aperture;
passing the reflected light through the second aperture to a third lens group;
passing the reflected light through the third lens group to a sensor; and
determining an optical parameter of the modulated light on the target using parallax displacement of a point in the modulated light, as the point is provided to the sensor in the reflected light.

* * * * *